(12) United States Patent
Wakui

(10) Patent No.: US 6,377,744 B1
(45) Date of Patent: Apr. 23, 2002

(54) REPRODUCING APPARATUS FOR PROCESSING RECORDING DATE-AND-TIME INFORMATION

(75) Inventor: Tetsuya Wakui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/169,443

(22) Filed: Oct. 9, 1998

(30) Foreign Application Priority Data

Oct. 17, 1997 (JP) .............................................. 9-284827

(51) Int. Cl.[7] .............................. H04N 5/91; H04N 7/00; H04N 5/76; H04N 5/225; H04N 11/00
(52) U.S. Cl. ........................ 386/46; 386/117; 348/232; 348/552
(58) Field of Search ............................... 386/1, 46, 38, 386/95, 83, 117; 348/232, 552

(56) References Cited

U.S. PATENT DOCUMENTS

| | | | | |
|---|---|---|---|---|
| 4,821,102 A | * | 4/1989 | Ichikawa et al. | 348/589 |
| 5,633,678 A | * | 5/1997 | Parulski et al. | 348/232 |
| 5,787,226 A | * | 7/1998 | Miyake et al. | 386/83 |
| 5,825,413 A | * | 10/1998 | Mullis | 348/155 |
| 5,903,407 A | * | 5/1999 | Tsai | 360/72.1 |

* cited by examiner

Primary Examiner—Wendy R. Gerber
Assistant Examiner—Polin Chieu
(74) Attorney, Agent, or Firm—Robin, Blecker & Daley

(57) ABSTRACT

A reproducing apparatus for reproducing a video signal and date-and-time information related to the video signal is arranged to detect a change in date on the basis of the date-and-time information reproduced, to display the data-and-time information for a predetermined period of time according to the change in date, and to inhibit the data-and-time information from being displayed after the lapse of the predetermined period of time.

21 Claims, 7 Drawing Sheets

| CONTENTS OF RECORD | DATE AND TIME OF RECORDING | SETTING 1: ONLY WHEN DATE CHANGES | SETTING 2: WHEN TIME DIFFERENCE IS LONGER THAN SIX HOURS | SETTING 3: WHEN DATE CHANGES AND WHEN TIME DIFFERENCE IS LONGER THAN ONE HOUR |
|---|---|---|---|---|
| CUT SCENE 1 | 1997/7/1 13:00→13:10 | ○ | ○ | ○ |
| CUT SCENE 2 | 1997/7/1 13:30→13:40 | × | × | × |
| CUT SCENE 3 | 1997/7/1 19:00→19:15 | × | × | ○ |
| CUT SCENE 4 | 1997/7/2 0:30→0:45 | ○ | × | ○ |
| CUT SCENE 5 | 1997/7/2 22:20→22:35 | × | ○ | ○ |
| CUT SCENE 6 | 1997/7/2 23:55→ 1997/7/3 0:05 | × ◐: HALFWAY IN SCENE | × | ○ ◐: HALFWAY IN SCENE |

FIG. 6
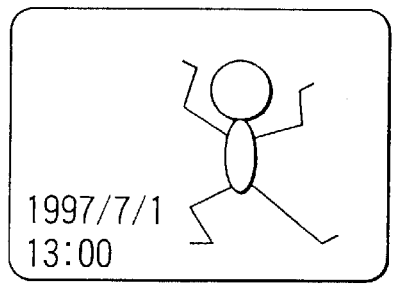
CUT SCENE 1
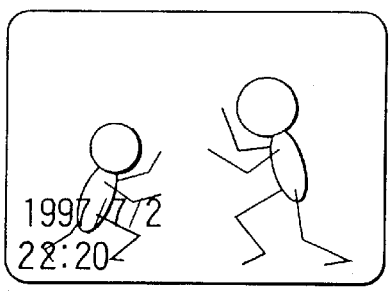
CUT SCENE 5
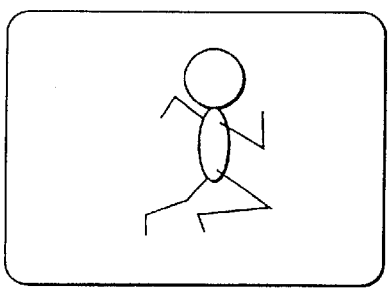
CUT SCENE 2
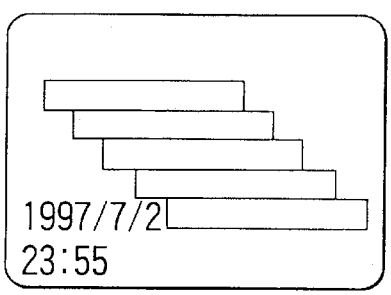
CUT SCENE 6
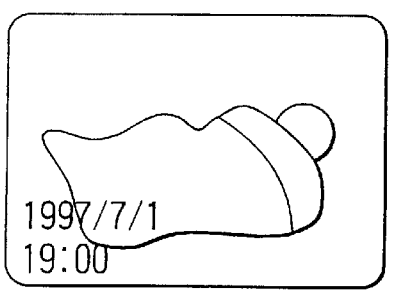
CUT SCENE 3
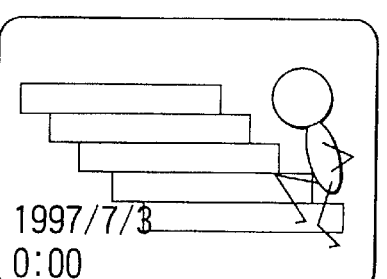
HALFWAY IN CUT SCENE 6
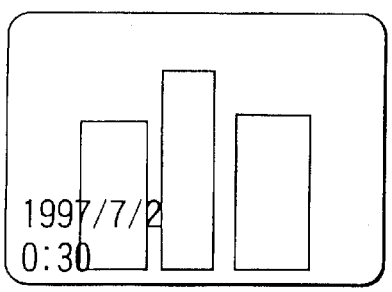
CUT SCENE 4

FIG. 7

| CONTENTS OF RECORD | DATE AND TIME OF RECORDING | SETTING 1: ONLY WHEN DATE CHANGES | SETTING 2: WHEN TIME DIFFERENCE IS LONGER THAN SIX HOURS | SETTING 3: WHEN DATE CHANGES AND WHEN TIME DIFFERENCE IS LONGER THAN ONE HOUR |
|---|---|---|---|---|
| CUT SCENE 1 | 1997/7/1 13:00→13:10 | ○ | ○ | ○ |
| CUT SCENE 2 | 1997/7/1 13:30→13:40 | × | × | × |
| CUT SCENE 3 | 1997/7/1 19:00→19:15 | × | × | ○ |
| CUT SCENE 4 | 1997/7/2 0:30→0:45 | ○ | × | ○ |
| CUT SCENE 5 | 1997/7/2 22:20→22:35 | × | ○ | ○ |
| CUT SCENE 6 | 1997/7/2 23:55→ 1997/7/3 0:05 | × | × | ○ |

○: HALFWAY IN SCENE

REPRODUCING APPARATUS FOR PROCESSING RECORDING DATE-AND-TIME INFORMATION

BACKGROUND OF THE INVENTION

1. Field of the Invention

The present invention relates to a reproducing apparatus, and more particularly to an arrangement for processing information on a recording date and time included in a reproduced signal.

2. Description of Related Art

The known reproducing apparatuses of the above-stated kind include camera-integrated type video tape recorders (VTRs). Some of the camera-integrated type VTRs are arranged to record, during the recording of a video image, date-and-time information (information on the date, the time or the date and time of recording) together with a video signal obtained by the image pickup operation, for example, to the effect that characters indicative of the date and time of recording are superimposed on the video image. Such a method of recording date-and-time information together with a video signal enables the date and time of recording to be readily recognized at the time of reproduction of the recorded video image.

In a case where the date-and-time information is thus recorded in the form of characters superimposed on the video image, the date-and-time information is always displayed on a reproduced picture plane. Therefore, the display of the date-and-time information occasionally hinders reproduced images from being appreciated.

In view of such a problem, there has been developed a method of recording the date-and-time information independently of the video signal, without superimposing the characters of the date-and-time information on the video image, and, at the time of reproduction, of forming characters on the basis of the date-and-time information and superimposing the characters on the reproduced images only when so desired. This method effectively prevents appreciation of reproduced images from being hindered, since the date-and-time information is displayed only when it is necessary, and is not always displayed on the reproduced picture plane.

According to the method of recording the date-and-time information independently of the video signal, the display of the date-and-time information is generally arranged to be turned on or off as desired by the user. If a date-and-time display switch is left in its on-state, the date and time of recording are always recognizable. In this case, however, a part of the reproduced image is hidden, at the time of reproduction, by the display of the date-and-time information, as in the case of the above-stated method of recording the date-and-time information in the form of characters superimposed on the video image.

Generally, in most cases, the date-and-time information, particularly the information on the date, is required only at the beginning of each scene of recorded images and is not necessary thereafter. Therefore, in a case where the date-and-time information has been recorded independently of the video signal, the user must operate the date-and-time display switch to turn it on and off repeatedly every time the recorded scenes change from one scene over to another. For the user, however, such an operation is extremely troublesome.

BRIEF SUMMARY OF THE INVENTION

It is a general object of the invention to solve the problems mentioned in the foregoing.

It is a more specific object of the invention to eliminate the troublesomeness in regard to the display of information on the date and time of recording.

It is another object of the invention to make a display of date-and-time information possible at any desired timing without hindering reproduced images from being appreciated.

To attain the above objects, in accordance with an aspect of the invention, there is provided a reproducing apparatus, which comprises reproducing means for reproducing from a recording medium a video signal and date-and-time information related to the video signal, character forming means for forming a character signal on the basis of the date-and-time information reproduced by the reproducing means, and control means for controlling a character forming action of the character forming means according to the date-and-time information reproduced by the reproducing means.

These and other objects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 6 shows examples of displays of date-and-time information made by the circuit shown in FIG. 4.

FIG. 7 is a table for explaining actions of the circuit shown in FIG. 4.

DETAILED DESCRIPTION OF THE INVENTION

Hereinafter, a preferred embodiment of the invention will be described in detail with reference-to the drawings.

Figure 1:
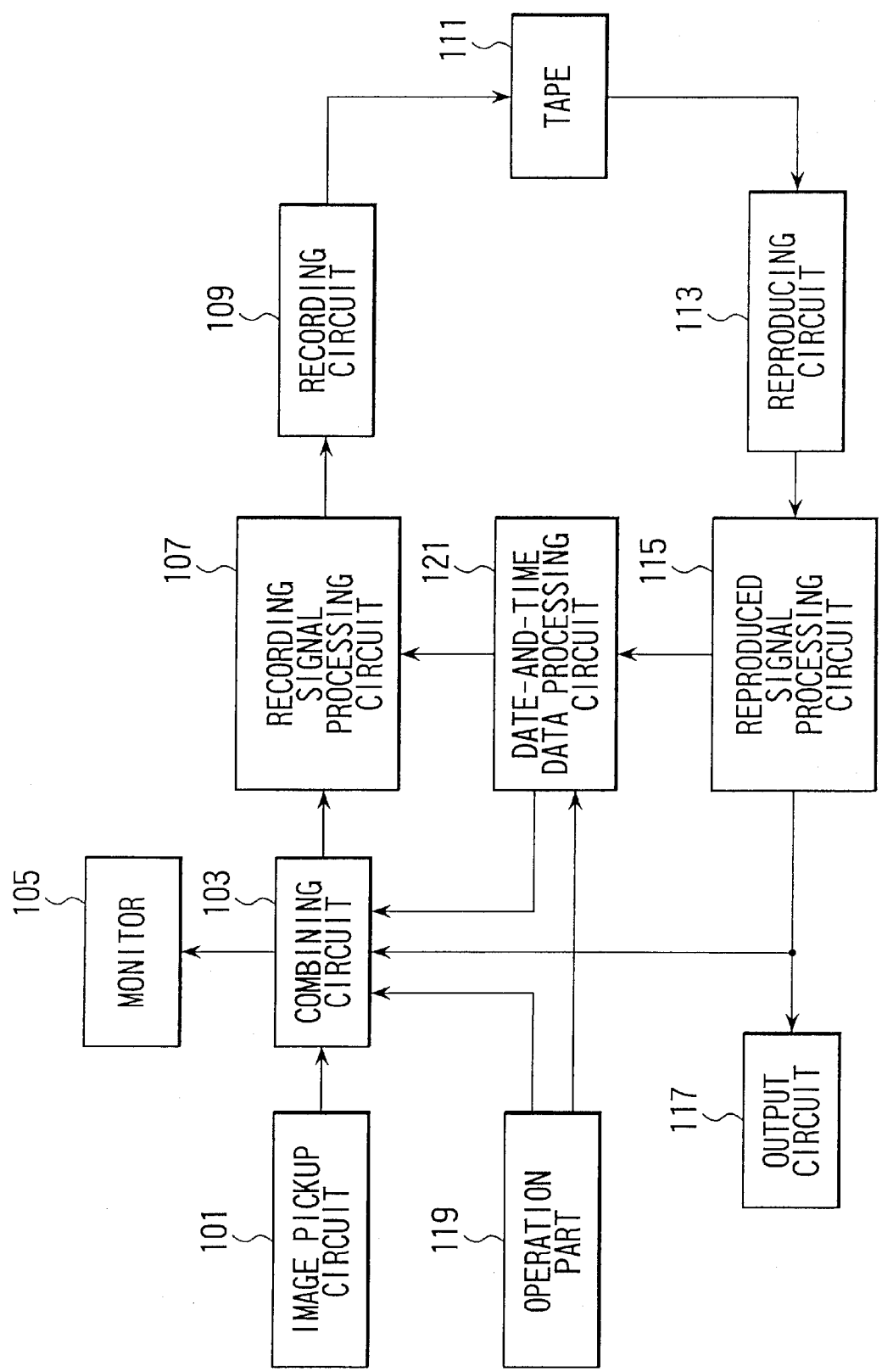
FIG. 1 is a block diagram showing the arrangement of a VTR to which the invention is applied.

FIG. 1 is a block diagram showing the arrangement of a digital VTR to which the invention is applied.

Referring to FIG. 1, a video signal obtained by an image pickup circuit 101 is supplied through a combining circuit 103 to a recording signal processing circuit 107. The combining circuit 103 is arranged to combine a video signal coming from the image pickup circuit 101 or a reproduced video signal from a reproduced signal processing circuit 115 with a date-and-time character signal coming from a date-and-time data processing circuit 121, according to a mode signal outputted from an operation part 119. A composite signal thus obtained by the combining circuit 103 is supplied to a monitor 105.

Figure 2:
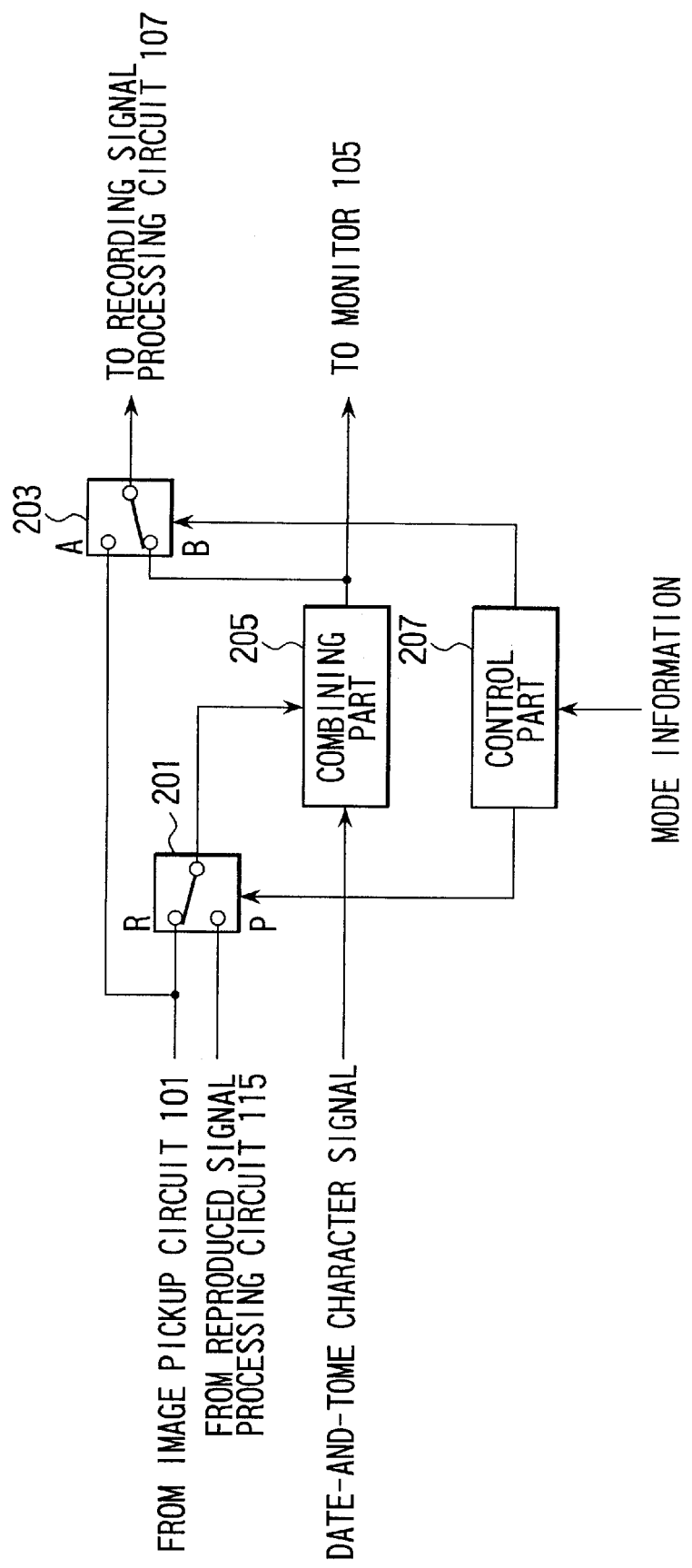
FIG. 2 is a circuit diagram showing the arrangement of a combining circuit shown in FIG. 1.

FIG. 2 is a circuit diagram showing the arrangement of the combining circuit 103.

Referring to FIG. 2, a video signal from the image pickup circuit 101 is supplied to switches 201 and 203. A reproduced video signal outputted from the reproduced signal processing circuit 115, as will be described later herein, is supplied to the switch 201. A control part 207 controls the switch 201 according to mode information from the operation part 119, in such a manner that the switch 201 is connected to a terminal R in the case of a recording mode and to a terminal P in the case of a reproduction mode. Thus, a video signal coming from the image pickup circuit 101 or a reproduced video signal coming from the reproduced signal processing circuit 115 is selectively supplied to a combining part 205.

A character signal indicative of date-and-time information which is formed in a manner as will be described later herein is supplied from the date-and-time data processing circuit 121 to the combining part 205. The combining part 205 combines the character signal and the video signal from the switch 201 and supplies a composite signal thus obtained to the monitor 105 and the switch 203. Accordingly, at the monitor 105, the picked-up video image and the date-and-time characters are displayed in a superimposed state in the recording mode, and the reproduced video image and the date-and-time characters are displayed in a superimposed state in the reproduction mode.

The switch 203 is also supplied with the video signal from the image pickup circuit 101. The control part 207 causes the switch 203 to select the video signal from the combining part 205 if a display of the date-and-time characters is turned on by the operation part 119, or the video signal from the image pickup circuit 101 if a display of the date-and-time characters is turned off by the operation part 119. The video signal selected by the switch 203 is supplied to the recording signal processing circuit 107.

The VTR is thus arranged to enable the user to have the picked-up image recorded either with the date-and-time characters superimposed thereon or with no date-and-time characters superimposed thereon, as desired.

The recording signal processing circuit 107 is arranged to perform a known block coding process on the video signal outputted from the combining circuit 103 and to compress the amount of information of the video signal thus processed. The recording signal processing circuit 107 is further arranged to form date-and-time data on the basis of the date-and-time information supplied from the date-and-time data processing circuit 121 and to add the date-and-time data, as additional information, to the compressed video signal. The video signal with the added date-and-time data is supplied to a recording circuit 109. Then, the recording circuit 109 converts the video signal into a form suited to recording by carrying out processing actions such as an error correction coding process, a digital modulation process, etc. After completion of these processes, the signal is recorded on a magnetic tape 111.

Figure 3:
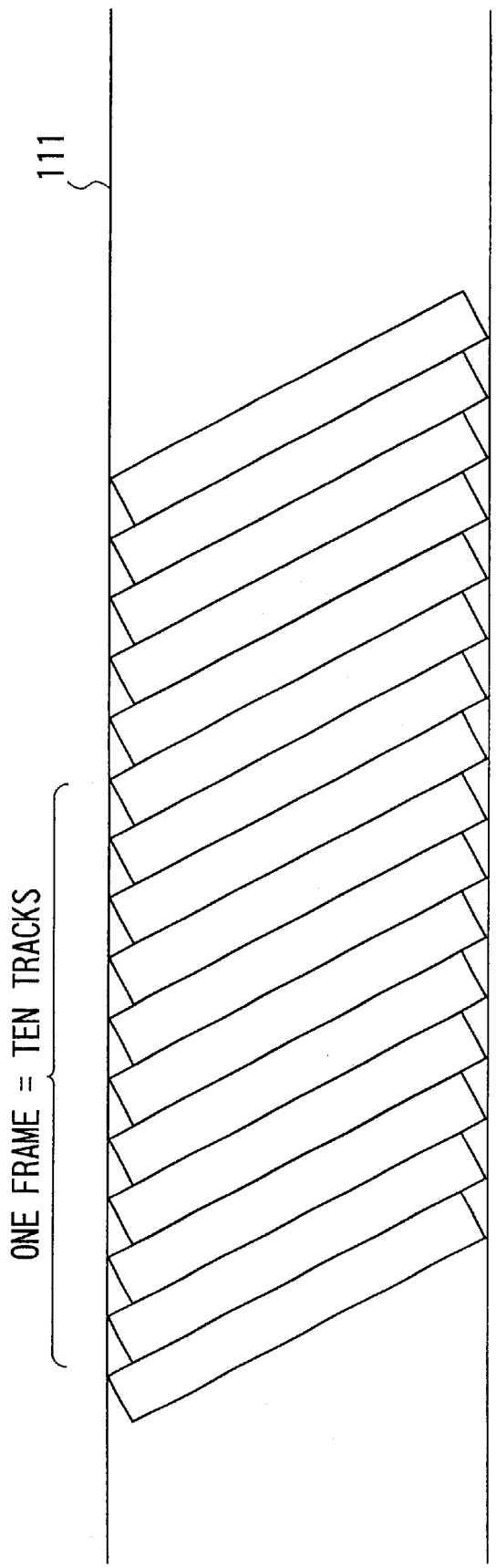
FIG. 3 is a diagram showing a recording format of the apparatus shown in FIG. 1.

In the case of the embodiment, as shown in FIG. 3, a video signal for one frame is recorded in ten tracks. At the time of recording, the date-and-time data is also recorded in each of the tracks. The content of the date-and-time data is updated for every frame.

A reproducing circuit 113 is arranged to reproduce the video signal and the date-and-time data recorded in the tape 111, to perform various processing actions, such as a digital demodulation process, an error correction process, etc., on the reproduced signal and data. The signal and data thus processed are sent to the reproduced signal processing circuit 115. In the case of the embodiment, the date-and-time information is recorded as additional information added to the video signal at the time of recording of the video signal, and is allowed to be processed independently of the video signal at the time of reproduction.

The reproduced signal processing circuit 115 is arranged to separate from each other the video signal and the date-and-time data outputted from the reproducing circuit 113. The date-and-time data is sent to the date-and-time data processing circuit 121. The reproduced signal processing circuit 115 decodes the reproduced video signal in a manner corresponding to the process performed at the time of recording, thereby expanding the amount of information of the reproduced video signal. After the decoding process, the reproduced video signal is sent to an output circuit 117 and the combining circuit 103.

The date-and-time data processing circuit 121 is arranged to form a character signal indicative of date-and-time information according to an operation on the operation part 119 in a manner as will be described later herein and to send the character signal to the combining circuit 103. The combining circuit 103 then combines the video signal received from the reproduced signal processing circuit 115 and the date-and-time character signal received from the date-and-time data processing circuit 121 and sends the combined signal to the monitor 105.

Next, processes to be performed by the date-and-time data processing circuit 121 are described below.

Figure 4:
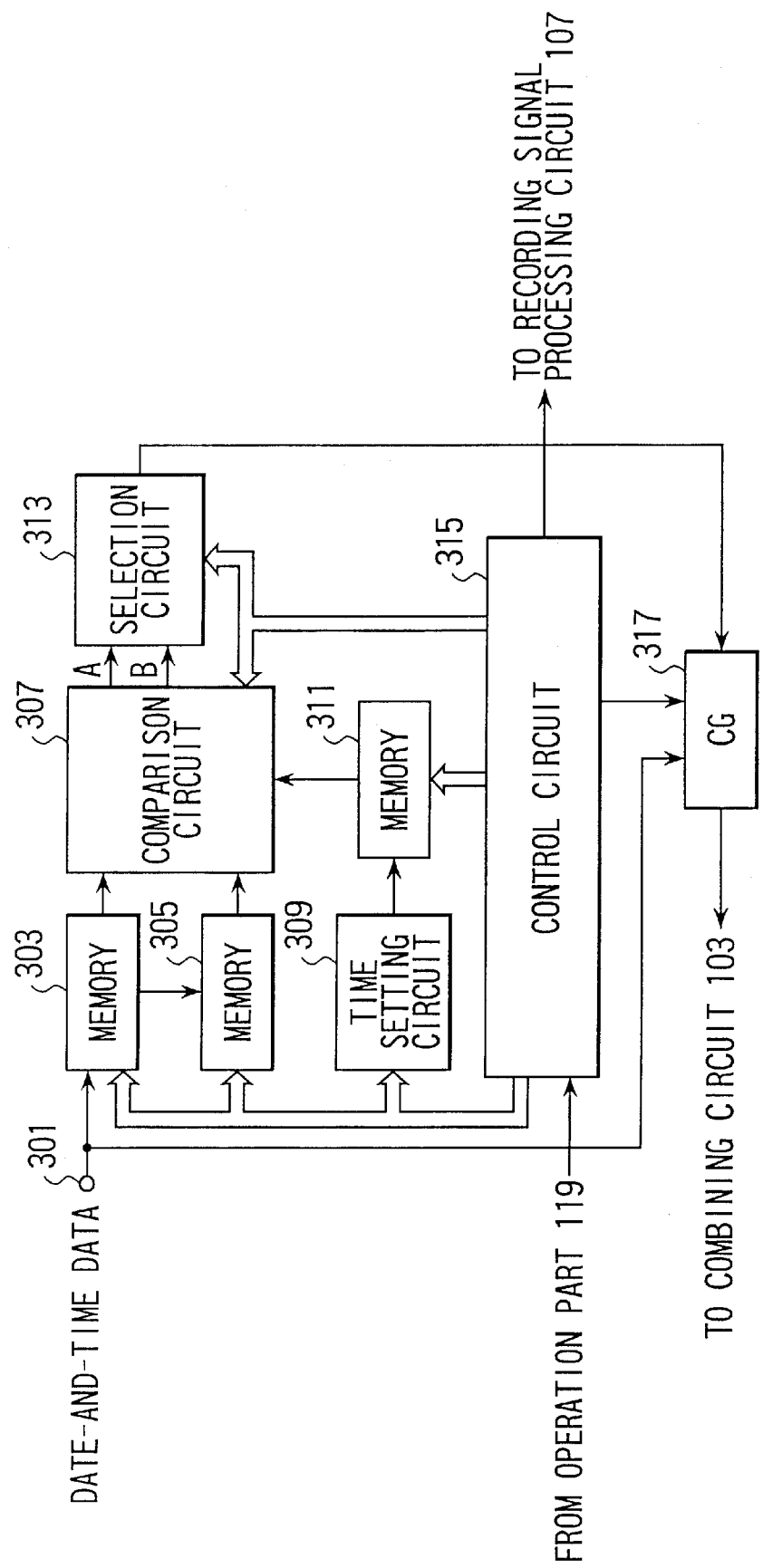
FIG. 4 is a block diagram showing the arrangement of a date-and-time data processing circuit shown in FIG. 1.

FIG. 4 is a circuit diagram showing the arrangement of the date-and-time data processing circuit 121.

Referring to FIG. 4, a control circuit 315 is arranged to control the action of each circuit part according to mode information received from the operation part 119. In the recording mode, the date-and-time data processing circuit 121 operates as follows.

In the recording mode, the control circuit 315 detects the date and time of recording on the basis of the output of a timer contained in the control circuit 315 and outputs to a character generator (hereinafter referred to as CG) 317 a control signal for causing the CG 317 to form a character signal indicative of the date-and-time information. In response to the control signal from the control circuit 315, the CG 317 forms the character signal indicative of the date and time at which recording is performed, and outputs the character signal to the combining circuit 103. The control circuit 315 sends the date-and-time information also to the recording signal processing circuit 107. In accordance with the date-and-time information from the control circuit 315, the recording signal processing circuit 107 forms date-and-time data.

In the reproduction mode, the date-and-time data processing circuit 121 operates as described below.

Date-and-time data outputted from the reproduced signal processing circuit 115 is supplied to a terminal 301 in the reproduction mode and is then sent to a memory 303. As mentioned in the foregoing, in the case of the embodiment, the date-and-time data is updated for every frame. The date-and-time data stored in the memory 303 is, therefore, written into another memory 305 at intervals of one frame period (1/30 sec). The date-and-time data stored in the memory 303 and the date-and-time data stored in the memory 305 are sent to a comparison circuit 307.

The comparison circuit 307 compares the content of the date-and-time data outputted from the memory 303 and that of the date-and-time data outputted from the memory 305 with each other. If the contents of the memories 303 and 305 are found to differ in date from each other, the comparison circuit 307 sends a signal of logic H (high level) from its output A. Further, if the difference between the contents of the date-and-time data of the memories 303 and 305 is found to be larger than a threshold value outputted from a memory 311, the comparison circuit 307 sends a signal of logic H (high level) from another output B.

The control circuit 315 is arranged to output threshold time value information to a time setting circuit 309 on the basis of a threshold time value sent from the operation part 119. The time setting circuit 309 writes the threshold time value information into the memory 311. This threshold time value can be set as desired by the user by operating the operation part 119.

A selection circuit 313 is controlled by the control circuit 315 to send the output A and/or the output B of the comparison circuit 307 to the CG 317. The CG 317 forms a character signal according to the date-and-time data received from the terminal 301, for a predetermined period of time (five sec. in the case of the embodiment) after the output from the selection circuit 313 becomes a logic H, and then sends the character signal to the combining circuit 103.

The control circuit 315 controls the selection circuit 313 on the basis of the output of the operation part 119, so as to select and send out the output A if the VTR is in a mode of displaying the date-and-time information only when the date changes, to select and send out the output B if the VTR is in a mode of displaying the date-and-time information when the date or time changes to an extent larger than a threshold value as set, or to select and send out both the outputs A and B when the VTR is in a mode of displaying the date-and-time information when the date changes and when the date or time changes to an extent larger than a threshold value as set.

The above actions are further described below with reference to FIG. 5 which is a flow chart.

Figure 5:
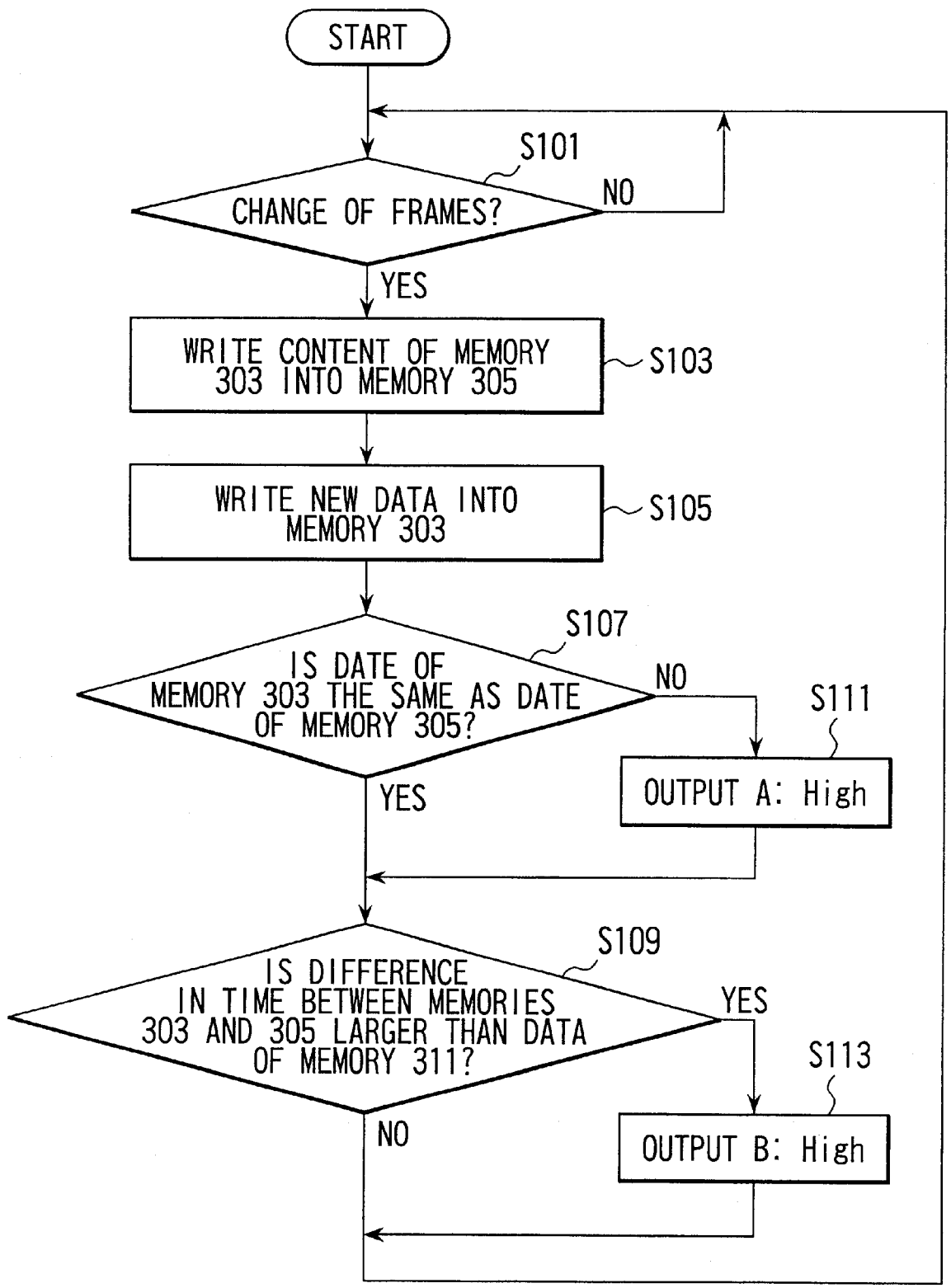
FIG. 5 is a flow chart showing a flow of operation of the circuit shown in FIG. 4.

At a step S101 of FIG. 5, since the date-and-time data is updated every time one frame changes over to another frame as mentioned above, a check is made for a change of frames. When the frames are found to have changed, the flow of operation proceeds to a step S103. At the step S103, date-and-time data stored in the memory 303 is written into the memory 305. At the next step S105, date-and-time data newly reproduced is written into the memory 303. Accordingly, with the exception of a scene changing part (connection part) of the recorded video signal, the date-and-time data stored in the memory 303 differs from the date-and-time data stored in the other memory 305 by one frame time, i.e., 1/30 sec. However, with respect to the date, the date-and-time data changes even at a part other than the connection part in a case where recording is performed across a time point of twelve o'clock midnight.

At a step S107, the comparison circuit 307 is caused to compare the date-and-time data of the memory 303 and that of the memory 305 to find if they are the same in date. If not, the flow proceeds to a step S111 to output a logic H signal to the output A. At a step S109, a check is made to find if a difference in time between the date-and-time data of the memory 303 and that of the memory 305 is larger than the threshold value data stored in the memory 311. If so, the flow proceeds to a step S113 to output a logic H signal to the output B.

The operation of the date-and-time data processing circuit 121 in the reproduction mode is next described by using some examples of displays.

Now, it is supposed that seven cut scenes as shown in FIG. 6 have been recorded on the tape 111 in the sequence of cut scenes 1, 2, 3, 4, 5 and 6. Of these cut scenes, the cut scene 6 alone has been recorded across twelve o'clock midnight.

FIG. 7 shows in a table how the display of the date-and-time information turns on and off according to setting of three kinds of date-and-time information display modes selected by the operation part 119. In FIG. 7, a mark ○ indicates an on-state of the display of the date-and-time information and a mark × indicates an off-state of the display of the date-and-time information. In the setting mode 1, the display of the date-and-time information is turned on only when the date changes. In the setting mode 2, the display of the date-and-time information is turned on when a difference between the date-and-time data of the memory 303 and that of the memory 305 becomes longer than six hours. In the setting mode 3, the display of the date-and-time information is turned on when the date changes and when the date-and-time data difference becomes one hour or longer.

As shown in FIG. 7, for the cut scene 1, the display of the date-and-time information turns on in all the setting modes 1, 2 and 3, since there is no prior record. For the cut scene 2, the display of the date-and-time information is not made in all the setting modes, since the cut scene 2 was obtained after the lapse of only 20 minutes from the end point of time of the cut scene 1 and thus the condition of any of these setting modes is not satisfied. For the cut scene 3, the display of the date-and-time information turns on in the case of the setting mode 3, since only the condition of the setting mode 3 is satisfied. For the cut scene 4, the display of the date-and-time information turns on in each of the setting modes 1 and 3, since the date was changed from that of the cut scene 3, but the display of the date-and-time information is not made in the case of the setting mode 2.

For the cut scene 5, the display of the date-and-time information is not made in the setting mode 1, since the date is the same as the date of the cut scene 4, while the display of the date-and-time information turns on in each of the setting modes 2 and 3, since the time difference satisfies the conditions of the setting modes 2 and 3. For the cut scene 6, the display of the date-and-time information turns on for the leading part of the cut scene 6 only in the setting mode 3. However, since the date changes at a halfway point of the cut scene 6, the display of the date-and-time information turns on at that point of time in each of the setting modes 1 and 3.

As described above, the embodiment is arranged to detect a change in recording date of the reproduced video signal and to automatically display the date-and-time information according to the result of the detection. The arrangement, therefore, obviates the necessity of giving an instruction for display of the date-and-time information at every recording part where the recording date changes, so that the user can be liberated from a troublesome operation of giving instructions for the display of the date-and-time information.

Further, the date-and-time information is automatically displayed when a time difference between the date-and-time information is longer than a predetermined threshold value. Therefore, the date-and-time information can be automatically displayed according to desired conditions set by the user, so that the date-and-time information can be recognized at any desired timing without hindering the reproduced video image from being appreciated.

Further, the invention is advantageous especially for editing work including a dubbing process. In recording a reproduced video signal on another recording medium by a dubbing process while superimposing some characters indicative of date-and-time information on the video signal, the timing of superimposing the characters is important. In a case where the user manually gives an instruction to turn on and off the display of date-and-time information, the manual operation by the user must be always performed to have the display of the date-and-time information turned on at a change-over part between one scene over to another while watching reproduced images of these scenes and turned off after the lapse of a period of several seconds. If the user happens to forget to have the display of the date-and-time information turned on at a change-over part between scenes, if a period during which the display of the date-and-time information is turned on is too long, or if the user happens to forget to have the display of the date-and-time information turned off, the quality of the images obtained by the dubbing process would be degraded. Further, in the event of the lapse of only a very short period of time after the end of one scene before the start of another scene, the date-and-time information does not have to be displayed.

All of these problems can be effectively solved according to the arrangement of the embodiment disclosed, because, at the time of reproduction of images, the date-and-time information is automatically superimposed on the video signal to be displayed together with the video image, according to conditions set by the user.

What is claimed is:

1. A reproducing apparatus comprising:
   reproducing means for reproducing from a recording medium a video signal and date-and-time information related to the video signal;
   character forming means for forming a character signal on the basis of the date-and-time information reproduced by said reproducing means; and
   control means for controlling a character forming operation of said character forming means according to the date-and-time information reproduced by said reproducing means, wherein said control means includes storage means for storing the date-and-time information reproduced by said reproducing means, and comparison means for comparing the date-and-time information from said reproducing means and the date-and-time information from said storage means, said control means controlling the character forming operation of said character forming means on the basis of a result of comparison made by said comparison means.

2. An apparatus according to claim 1, wherein said control means controls whether to cause said character forming means to perform the character forming operation.

3. An apparatus according to claim 1, wherein, when detecting a change in date between the date-and-time information from said reproducing means and the date-and-time information from said storage means on the basis of the result of comparison, said control means controls said character forming means so as to form the character signal for a predetermined period of time.

4. An apparatus according to claim 1, wherein, when detecting a difference by a predetermining threshold value or more between the date-and-time information from said reproducing means and the date-and-time information from said storage means on the basis of the result of comparison, said control means controls said character forming means so as to form the character signal for a predetermined period of time.

5. An apparatus according to claim 4, wherein said control means includes setting means for manually setting the threshold value.

6. An apparatus according to claim 1, further comprising:
   combining means for combining the character signal formed by said character forming means with the reproduced video signal to produce a combined video signal; and
   output means for supplying the combined video signal from said combining means to a display means.

7. An apparatus according to claim 1, further comprising:
   image pickup means;
   date-and-time information forming means, having a timer, for forming date-and-time information on the basis of an output of said timer; and
   recording means for recording, on the recording medium, a video signal from said image pickup means and the date-and-time information formed by said date-and-time information forming means.

8. An apparatus according to claim 7, wherein said character forming means further forms a character signal on the basis of the date-and-time information formed by said data-and-time information forming means.

9. An apparatus according to claim 8, further comprising:
   combining means for combining the character signal formed by said character forming means and the video signal from said image pickup means to produce a combined video signal; and
   output means for supplying the combined video signal from said combining means to a display means.

10. A reproducing apparatus comprising:
    reproducing means for reproducing from a recording medium a video signal and date-and-time information related to the video signal;
    display means for displaying the date-and-time information reproduced by said reproducing means; and
    control means for controlling a displaying operation of said display means according to the date-and-time information reproduced by said reproducing means, wherein said control means includes storage means for storing the date-and-time information reproduced by said reproducing means, and comparison means for comparing the date-and-time information from said reproducing means and the date-and-time information from said storage means, said control means controlling the displaying operation of said display means on the basis of a result of comparison made by said comparison means.

11. An apparatus according to claim 10, wherein said control means controls whether to cause said display means to display the date-and-time information.

12. An apparatus according to claim 10, wherein, when detecting a change in date between the date-and-time information from said reproducing means and the date-and-time information from said storage means on the basis of the result of comparison, said control means controls said display means so as to display the date-and-time information for a predetermined period of time.

13. An apparatus according to claim 10, wherein, when detecting a difference by a predetermined threshold value or more between the date-and-time information from said reproducing means and the date-and-time information from said storage means on the basis of the result of comparison, said control means controls said display means so as to display the date-and-time information for a predetermined period of time.

14. An apparatus according to claim 13, wherein said control means includes setting means for manually setting the threshold value.

15. An apparatus according to claim 10, wherein said display means displays a video image represented by the reproduced video signal and the date-and-time information in a superimposed manner.

16. An apparatus according to claim 10, further comprising:

image pickup means;

date-and-time information forming means, having a timer, for forming date-and-time information on the basis of an output of said timer; and recording means for recording, on the recording medium, a video signal from said image pickup means and the date-and-time information formed by said date-and-time information forming means.

17. An apparatus according to claim 16, wherein said display means further displays a video image represented by the video signal from said image pickup means and the date-and-time information in a superimposed manner.

18. A reproducing apparatus for reproducing a video signal and date-and-time information related to the video signal, characterized by:

detecting a change in date on the basis of the date-and-time information reproduced; displaying the data-and-time information for a predetermined period of time according to the change in date; and inhibiting the data-and-time information from being displayed after the lapse of the predetermined period of time.

19. An apparatus according to claim 18, wherein a video image represented by the reproduced video signal and the date-and-time information are displayed in a superimposed manner.

20. A reproducing apparatus for reproducing a video signal and date-and-time information related to the video signal, characterized by:

detecting whether the date-and-time information currently reproduced varies, by a predetermined length of time or more, from the date-and-time information outputted from a memory for storing the reproduced date-and-time information; displaying the reproduced data-and-time information for a predetermined period of time according to the detection of variation; and inhibiting the data-and-time information from being displayed after the lapse of the predetermined period of time.

21. An apparatus according to claim 18, wherein a video image represented by the reproduced video signal and the date-and-time information are displayed in a superimposed manner.

* * * * *

UNITED STATES PATENT AND TRADEMARK OFFICE
CERTIFICATE OF CORRECTION

PATENT NO.   : 6,377,744 B1
DATED        : April 23, 2002
INVENTOR(S)  : Tetsuya Wakui It is certified that error appears in the above-identified patent and that said Letters Patent is hereby corrected as shown below:

Column 2,
Line 45, delete "reference-to" and insert -- reference to --.

Signed and Sealed this

First Day of October, 2002

Attest:

Attesting Officer

JAMES E. ROGAN
*Director of the United States Patent and Trademark Office*